US008246308B2

United States Patent
Numajiri

(10) Patent No.: US 8,246,308 B2
(45) Date of Patent: Aug. 21, 2012

(54) TURNING DEVICE FOR WIND TURBINE ROTOR AND WIND TURBINE GENERATOR INCLUDING THE SAME

(75) Inventor: Tomohiro Numajiri, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/314,601

(22) Filed: Dec. 8, 2011

(65) Prior Publication Data

US 2012/0133147 A1    May 31, 2012

Related U.S. Application Data

(63) Continuation of application No. PCT/JP2011/073336, filed on Oct. 11, 2011.

(51) Int. Cl.
*F03D 11/02* (2006.01)
*F03D 1/00* (2006.01)
*F02D 11/00* (2006.01)

(52) U.S. Cl. ................... 416/169 R; 416/170 R
(58) Field of Classification Search ............... 415/123, 415/124.1, 124.2; 416/169 R, 170 R
See application file for complete search history.

(56) References Cited

U.S. PATENT DOCUMENTS

| 2008/0181761 A1* | 7/2008 | Moore et al. ............ 415/1 |
| 2009/0278359 A1 | 11/2009 | Trede |

FOREIGN PATENT DOCUMENTS

| EP | 1167754 A2 * | 1/2002 |
| JP | 2003-343419 A | 12/2003 |
| JP | 2007-100558 A | 4/2007 |
| WO | WO 2010/103086 A2 | 9/2010 |

* cited by examiner

*Primary Examiner* — Edward Look
*Assistant Examiner* — Jesse Prager
(74) *Attorney, Agent, or Firm* — Manabu Kanesaka; Kenneth M. Berner; Benjamin J. Hauptman

(57) ABSTRACT

A turning device includes a brake disc, functioning as a driven-side friction pulley, which is disposed on an output shaft of a gearbox and rotates together with the output shaft; a motor-side friction pulley, which can move between an engagement position, where the motor-side friction pulley frictionally engages with an outer circumferential surface of the brake disc, and a free position, where the motor-side friction pulley is a certain distance away from the outer circumferential surface of the brake disc; a pulley pressing mechanism, which moves the motor-side friction pulley from the free position to the engagement position by manual power of an operator to frictionally engage the motor-side friction pulley with the outer circumferential surface of the brake disc; and pulley driving means (electric motor, etc.) for rotationally driving the motor-side friction pulley.

8 Claims, 7 Drawing Sheets

TURNING DEVICE FOR WIND TURBINE ROTOR AND WIND TURBINE GENERATOR INCLUDING THE SAME

CROSS REFERENCE TO RELATED APPLICATIONS

This application is a continuation application of PCT/JP2011/073336 filed on Oct. 11, 2011, the contents of which is hereby incorporated by its reference.

BACKGROUND OF THE INVENTION

1. Field of the Invention

The present invention relates to a turning device for a wind turbine rotor that rotates a wind turbine rotor to a desired position when wind speed is low and relates to a wind turbine generator including the same.

2. Description of Related Art

A typical propeller-type wind turbine generator includes a wind turbine rotor having a plurality of wind-turbine blades attached to a rotor head, serving as a center of rotation. The wind turbine rotor is axially supported on a nacelle, which is supported at the top of a tower in a yawable manner; and a gearbox and a generator are disposed inside the nacelle. When the wind turbine rotor rotates by receiving wind, the rotation is sped-up at the gearbox and is transmitted to the generator, and electric power is generated. For an upwind-type wind turbine generator, yaw driving control of the nacelle is carried out so that the rotation center axis of the rotor head (wind turbine rotor) is always orientated windward to efficiently generate power.

In addition, a pitch driving apparatus that turns the wind turbine blades provided on the wind turbine rotor with respect to the rotor head with a driving source, such as hydraulic pressure, to change the pitch angles (angles of attack) of the wind-turbine blades is provided. With such a pitch driving apparatus, the wind-turbine blades are turned to a fine side at which the pitch angle increases when the wind speed is low and to a feather side at which the pitch angle decreases when the wind speed is high. In this way, the generator can efficiently generate power near a desired rotary speed.

With such a wind turbine generator, since the rotation of the wind turbine rotor must be locked at an arbitrary position for maintenance of the wind-turbine blades, pitch driving apparatus, etc., for safety, maintenance is performed in relatively weak wind with a wind speed of approximately 0 to 15 m/s. At this time, if the wind speed is approximately 3 m/s, the wind turbine rotor can idle, a brake can be applied at a predetermined position, and a lock pin can be inserted to lock the rotation of the wind turbine rotor. However, to be able to turn the wind turbine rotor to an arbitrary position in the case where there is absolutely no wind, usually, a turning device using motive power of a small electric motor is provided, as disclosed in US Patent Application, Publication No. 2009/0278359.

In the turning device disclosed in US Patent Application, Publication No. 2009/0278359, a small electric motor is disposed in a gearbox, and the motive power of the electric motor is transmitted to a predetermined rotary shaft of the gearbox via a speed-down gear to rotate (turn) the wind turbine rotor. Specifically, a torque driver is connected to a shaft of an oil pump for gear lubrication, which is attached to the external surface of the gearbox, with an adapter; and the motive power of the electric motor built into the torque driver is transmitted to the rotary shaft of the gearbox via the main shaft of the oil pump and the speed-down gear to rotationally drive the wind turbine rotor.

With the turning device disclosed in US Patent Application, Publication No. 2009/0278359, however, driving-force transmitting parts (input shaft, speed-down gear, bearing, etc.) that transmit the driving force of the electric motor to the wind turbine rotor are designed with relatively large strength such that the strength is achieved in all wind speed ranges (approximately 0 to 15 m/s) in which maintenance is possible.

However, as described above, actually, if there is a wind speed of approximately 3 m/s, the wind turbine rotor can be idled by manually operating the pitch driving apparatus, and thus, in many cases, the turning device does not have to be used. Hence, the turning device is expensive equipment although its frequency of use is low with respect to the operating time of the wind turbine generator, and this has been a cause of the increase in the manufacturing costs of wind turbine generators.

With the turning device according to US Patent Application, Publication No. 2009/0278359, since the driving force of the electric motor is transmitted to the rotary shaft of the gearbox via the relatively expensive gear mechanism, this has also increased the manufacturing costs. Furthermore, if the structure is such that the motive power of the electric motor is transmitted to the wind turbine rotor by the gear mechanism, in the event of a large torque fluctuation caused by the wind turbine rotor due to a gust of wind generated while turning the wind turbine rotor when the wind speed is low, the torque fluctuation will be directly transmitted to the electric motor, and thus, there is a concern that driving-power transmitting parts, such as the electric motor, the gear mechanism, etc., may be damaged.

BRIEF SUMMARY OF THE INVENTION

The present invention has been conceived to solve the problems described above, and an object thereof is to provide a turning device for a wind turbine rotor and a wind turbine generator including the same in which, through a simple and inexpensive configuration, the wind turbine rotor can be easily turned to an arbitrary position, and damage is not caused even when there is a large torque fluctuation caused by the wind turbine rotor receiving a gust of wind.

To achieve the above-described object, the present invention provides the following solutions.

That is, a first aspect of the turning device for a wind turbine rotor according to the present invention includes a turning device for a wind turbine rotor, configured to turn the wind turbine rotor to an arbitrary position, the turning device including a driven-side friction pulley configured to rotate together with an output shaft of the wind turbine rotor; a motor-side friction pulley configured to be movable between an engagement position where the motor-side friction pulley frictionally engages with an outer circumferential surface of the driven-side friction pulley and a free position where the motor-side friction pulley is not frictionally engaged with the outer circumferential surface of the driven-side friction pulley; a pulley pressing mechanism configured to move the motor-side friction pulley from the free position to the engagement position by manual power of an operator and to frictionally engage the motor-side friction pulley with the outer circumferential surface of the driven-side friction pulley; and pulley driving means for rotationally driving the motor-side friction pulley.

With the turning device having the above-described configuration, the motor-side friction pulley is moved from the free position to the engagement position by the operator operating the pulley pressing mechanism, and the motor-side friction pulley is frictionally engaged with the outer circumferential surface of the driven-side friction pulley before rotationally driving the motor-side friction pulley with the pulley driving means. In this way, the rotation of the motor-side friction pulley is transmitted to the driven-side friction pulley and the output shaft of the gearbox, and the wind turbine rotor is rotationally driven thereby. Thus, the wind turbine rotor can be easily turned to an arbitrary position.

Once the wind turbine rotor is turned to the arbitrary position, a brake is applied to stop the movement of the wind turbine rotor, and simultaneously, the rotation of the motor-side friction pulley is stopped or the pulley pressing mechanism is operated to move the motor-side friction pulley from the engagement position to the free position to disengage the frictional engagement between the motor-side friction pulley and the driven-side friction pulley. In this way, the wind turbine rotor can be locked at an arbitrary position.

With this turning device, when there is a large torque change caused by the wind turbine rotor due to a gust of wind generated while turning the wind turbine rotor to an arbitrary position, the frictional engagement between the motor-side friction pulley and the driven-side friction pulley slips, and, as a result, the large torque change caused by the wind turbine rotor is prevented from being directly transmitted to the pulley driving means side. Thus, damage to the pulley driving means and the parts that transmit the driving force of the pulley driving means to the wind turbine rotor side can be prevented.

The entire turning device can be formed inexpensively, which can contribute to a reduction in the manufacturing costs of the wind turbine generator because the driving-force transmitting parts do not need to be designed with high strength to bear a large torque fluctuation generated by the wind turbine rotor when there is a gust of wind; in addition, the structure of the friction pulleys is extremely simple, and an expensive gear mechanism is not required; and in addition, when, for example, an electric motor is used as the pulley driving means, the electric motor has a low power output that is just enough for turning the wind turbine rotor when the wind speed is 3 m/s or less.

According to a second aspect of the turning device for a wind turbine rotor according to the present invention, the driven-side friction pulley in the first aspect is a rotation restricting member that is disposed on the output shaft so as to rotate together with the output shaft and that is configured to brake and/or lock the rotation of the output shaft.

With the above-described configuration, since a known rotation restricting member can be used without any changes as the driven-side friction pulley, it is not necessary to prepare a new component, and the turning device can be made more inexpensive.

According to a third aspect of the turning device for a wind turbine rotor according to the present invention, the pulley pressing mechanism in the first aspect includes a fulcrum disposed on a bearing member of the output shaft, and a pressing lever axially supported at the fulcrum; the motor-side friction pulley is disposed at a point of load of the pressing lever; and the motor-side friction pulley is moved to the engagement position to be frictionally engaged with the outer circumferential surface of the driven-side friction pulley by the operator applying a force to a point of effort of the pressing lever.

With the above-described configuration, through an extremely simple and inexpensive structure, the rotation of the motor-side friction pulley is transmitted to the driven-side friction pulley to drive it. At this time, the frictional engagement force between the motor-side friction pulley and the driven-side friction pulley can be adjusted by adjusting the force applied to the pressing lever by the operator, and the rotation of the driven-side friction pulley can be easily controlled. Thus, the wind turbine rotor can be easily turned to an arbitrary position.

According to a fourth aspect of the turning device for a wind turbine rotor according to the present invention, static-friction-coefficient increasing means for increasing a coefficient of static friction is attached to at least one of the outer circumferential surfaces of the driven-side friction pulley and the motor-side friction pulley in the first aspect.

With the above-described configuration, the frictional engagement force between the driven-side friction pulley and the motor-side friction pulley is increased, and the slippage between both pulleys decreases. Thus, the wind turbine rotor can be quickly turned to a desired position. Moreover, the configuration of the pulley pressing mechanism that frictionally engages the motor-side friction pulley to the driven-side friction pulley can be made simple and inexpensive.

According to a fifth aspect of the turning device for a wind turbine rotor according to the present invention, the coefficient of static friction in the fourth aspect is set between 0.5 and 1.3.

With the above-described configuration, the rotation of the motor-side friction pulley can be reliably transmitted to the driven-side friction pulley, and, when there is a large torque change caused by the wind turbine rotor due to a gust of wind, damage to the pulley driving means and the parts that transmit the driving force of the pulley driving means to the wind turbine rotor can be prevented by relaxing the torque fluctuation by allowing the frictional engagement between the motor-side friction pulley and the drive-side friction pulley to slip.

According to a sixth aspect of the turning device for a wind turbine rotor according to the present invention, the pressing lever in the third aspect includes an input display unit configured to display the magnitude of the force applied to the point of effort by the operator.

With the above-described configuration, since the amount of force applied to the pressing lever by the operator can be determined, by setting an optimal amount of force in advance, the frictional engagement force of the motor-side friction pulley and the driven-side friction pulley can be set to an optimal magnitude so as to reliably transmit the rotation of the motor-side friction pulley to the driven-side friction pulley, and damage to the pulley driving means, the motor-side friction pulley, the driven-side friction pulley, etc. can be prevented by allowing the frictional engagement between the motor-side friction pulley and the driven-side friction pulley to slip when there is a gust of wind.

According to a seventh aspect of the turning device for a wind turbine rotor according to the present invention, the input display unit in the sixth aspect is configured to detect the magnitude of the force applied by the operator on the basis of an amount of bowing of the pressing lever.

With the above-described configuration, since the magnitude of the force applied by the operator is detectable through an extremely simple configuration, the turning device can have an inexpensive configuration.

The wind turbine generator according to the present invention includes the turning device for a wind turbine rotor according to the first aspect. In this way, the manufacturing cost of the wind turbine generator can be reduced, and the maintainability of the wind turbine generator can be improved.

As described above, in the turning device for a wind turbine rotor according to the present invention and the wind turbine generator including the same, through a simple and inexpensive configuration, the wind turbine rotor can be turned to an arbitrary position, and the soundness of the turning device can be maintained by relaxing a torque fluctuation by allowing the frictional engagement between the motor-side friction pulley and the driven-side friction pulley to slip when there is a large torque fluctuation caused by the wind turbine rotor due to a gust of wind.

BRIEF DESCRIPTION OF THE SEVERAL VIEWS OF THE DRAWINGS

FIG. 6(a) is a longitudinal sectional view of an example in which knurling is applied to the outer circumferential surface of the pulley, FIG. 6(b) is a longitudinal sectional view of an example in which hard chips are attached to the outer circumferential surface of the pulley, and FIG. 6(c) is a longitudinal sectional view of an example in which a high-friction coating or an elastic film is applied to the outer circumferential surface of the pulley.

FIG. 7(a) is a front view of a state in which force is not applied to the pressing lever, and FIG. 7(b) is a front view of a state in which force is applied to the pressing lever.

DETAILED DESCRIPTION OF THE INVENTION

An embodiment of the present invention will be described below with reference to FIGS. 1 to 8.

Figure 1:
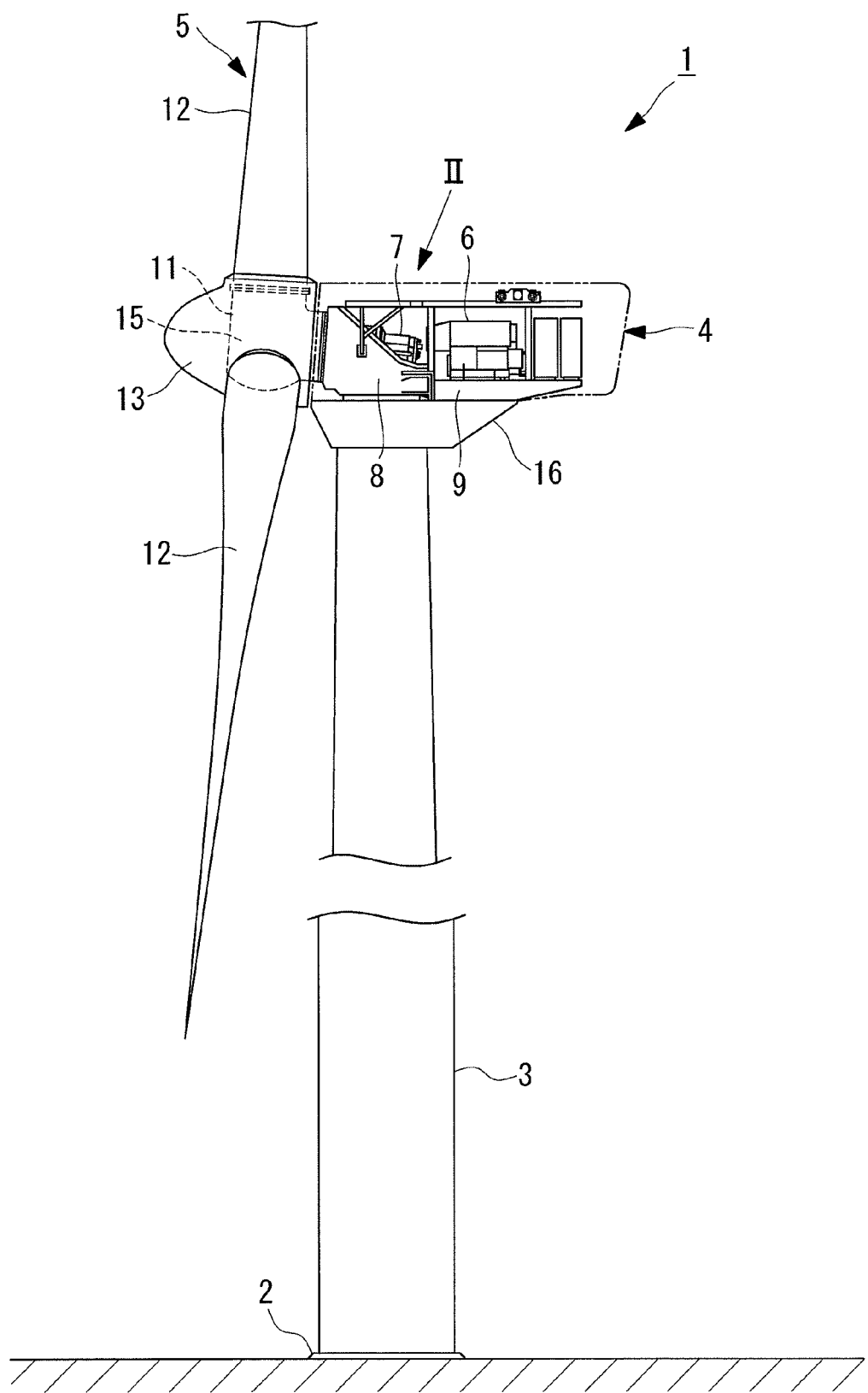
FIG. 1 is a side view illustrating an example of a wind turbine generator to which an embodiment of a turning device for a wind turbine rotor is applied.

FIG. 1 is a side view of an example of a wind turbine generator to which a turning device according to an embodiment of the present invention can be applied. The wind turbine generator 1 includes a tower 3 vertically disposed on the upper surface of a reinforced concrete foundation 2, which is, for example, embedded in the ground; a nacelle 4 disposed at the upper end of the tower 3; a wind turbine rotor 5 disposed on the nacelle 4; and a generator 6 and gearbox 7, which are accommodated inside the nacelle 4 and generate electric power by means of the rotation of the wind turbine rotor 5.

The gearbox 7 is accommodated inside a highly rigid steel nacelle bed plate 8, together with a main bearing (not shown), which axially supports the main shaft of the wind turbine rotor 5; and the nacelle bed plate 8 is axially supported at the upper end of the tower 3 in such a manner that it can freely yaw. The rear section of the nacelle bed plate 8 is connected to a generator mounting base 9, on which the generator 6 is mounted. In this configuration, the nacelle bed plate 8 and the generator mounting base 9 are accommodated inside the nacelle 4.

The wind turbine rotor 5 includes a rotor head 11 axially supported by the nacelle bed plate 8 in such a manner that it freely rotates around a rotary shaft in a substantially horizontal transverse direction; a plurality of (for example, three) wind-turbine blades 12 attached to the rotor head 11 and extending radially; a head capsule 13 covering the rotor head 11; and a pitch driving device 15 disposed inside the rotor head 11. The pitch driving device 15 is a device that changes the pitch angles of the wind-turbine blades 12 by turning the wind-turbine blades 12 in a twisting direction with respect to the rotor head 11.

The nacelle 4, the nacelle bed plate 8, and the generator mounting base 9 can yaw in the horizontal direction at the upper end of the tower 3 together with the wind turbine rotor 5. The wind turbine generator 1 is an up-wind type in which the wind turbine rotor 5 is disposed on the windward surface of the nacelle 4. When external wind strikes the wind-turbine blades 12, the wind turbine rotor 5 (rotor head 11) rotates; this rotation is appropriately sped-up by the gearbox 7 and is transmitted to the generator 6; and the generator 6 is driven to generate electric power. Yaw control of the nacelle 4 is performed by a yaw driving device 16 and a control device (not shown) so that the wind turbine rotor 5 is always orientated in the windward direction to efficiently generate electric power.

As is known, in response to the wind conditions and the operating conditions, the pitch driving device 15 turns each of the wind-turbine blades 12 toward a fine side at which the pitch angle is increased or a feather side at which the pitch angle is decreased. In this way, the wind turbine rotor 5 can be set to a desired rotational speed in response to a constantly changing wind force.

Figure 2:
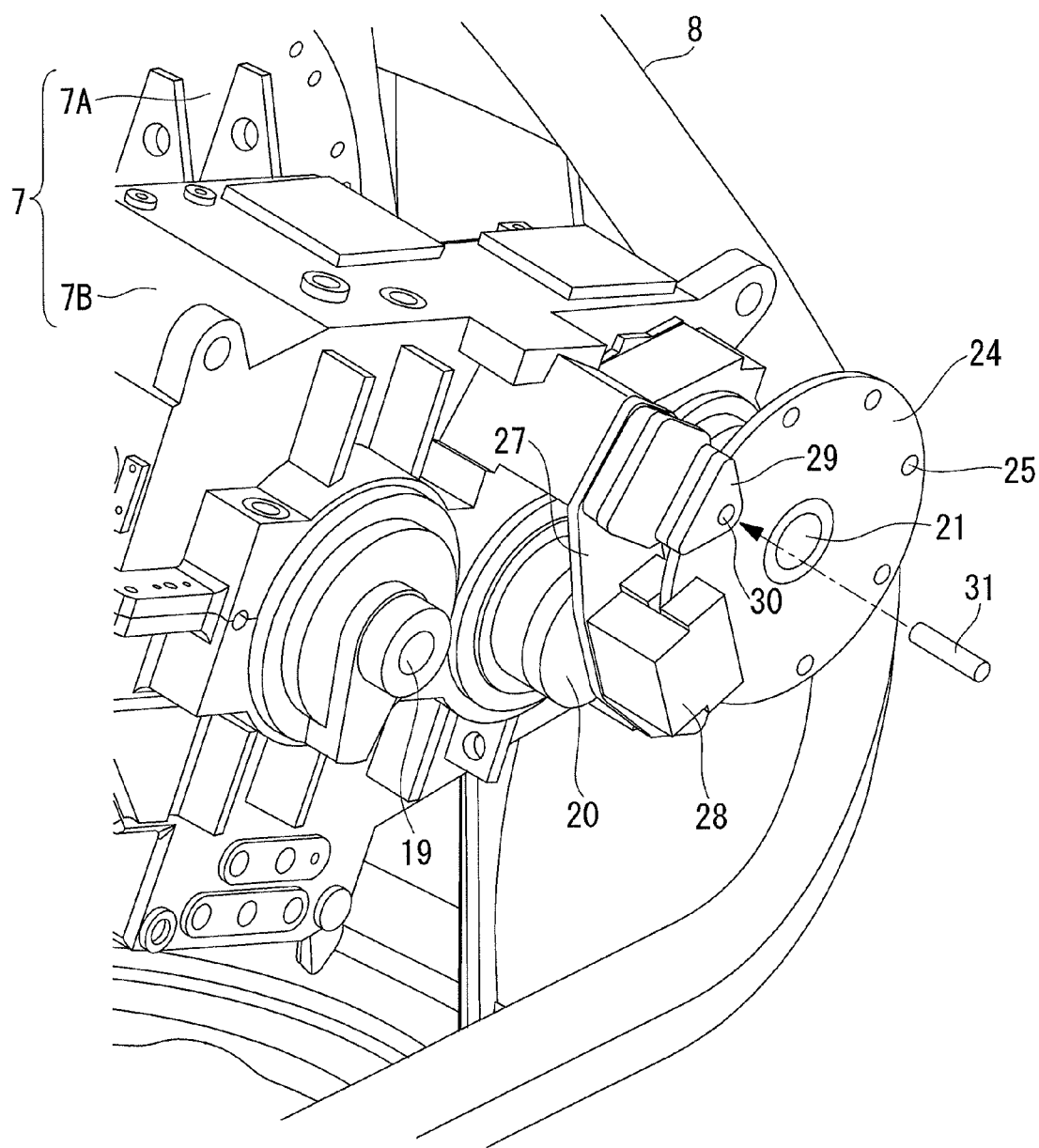
FIG. 2 is a perspective view of the turning device according to an embodiment of the present invention, viewed in the direction of arrow II in FIG. 1.

FIG. 2 is a perspective view in the direction of arrow II in FIG. 1. The gearbox 7 has configuration in which, for example, a planetary gear speed-up unit 7A and a multi-step gear speed-up unit 7B are combined; the multi-step gear speed-up unit 7B includes an input shaft 19, an intermediate shaft 20, and an output shaft 21. The rotation of the wind turbine rotor 5 is further sped-up in two steps at the multi-step gear speed-up unit 7B after being sped-up at the planetary gear speed-up unit 7A and is output via the output shaft 21. Then, the rotation of the output shaft 21 is transmitted to the generator 6 via a shaft coupling (not shown).

The output shaft 21 has a brake disc 24, which rotates together therewith. The brake disc 24 is a rotation restricting member for braking and locking the rotation of the output shaft 21, as well as a member that functions as a driven-side friction pulley of a turning device 35, which is described below, and has a thickness that allows it to be used as a pulley. A plurality of lock-pin through-holes 25 are formed in the brake disc 24 at equal intervals around the circumference.

On the external surface of the multi-step gear speed-up unit 7B (bearing member of the output shaft 21), a plate-like caliper bracket 27 is secured at a position near the brake disc 24, and a brake caliper 28 is secured thereto. The brake caliper 28 clamps the brake disc 24 with a force of, for example, hydraulic pressure, to brake the rotation of the brake disc 24 and the output shaft 21.

A lock-pin bracket 29 is secured on the caliper bracket 27 adjacent to the brake caliper 28. The lock-pin bracket 29 is shaped to sandwich the brake disc 24 without contacting the brake disc 24 and has a lock-pin insertion hole 30, which is aligned with one of the plurality of lock-pin through-holes 25 formed in the brake disc 24.

By aligning one of the lock-pin through-holes 25 in the brake disc 24 with the lock-pin insertion hole 30 in the lock-pin bracket 29 and inserting a lock pin 31, the rotation of the output shaft 21, i.e., the rotation of the wind turbine rotor 5 can be locked. Maintenance of the wind-turbine blades 12, the pitch driving device 15, etc. is performed with the rotation of the wind turbine rotor 5 locked. Since the output shaft 21 is the final speed-up shaft, the rotation of the wind turbine rotor 5 can be reliably braked and locked with a relatively small force.

Figure 3:
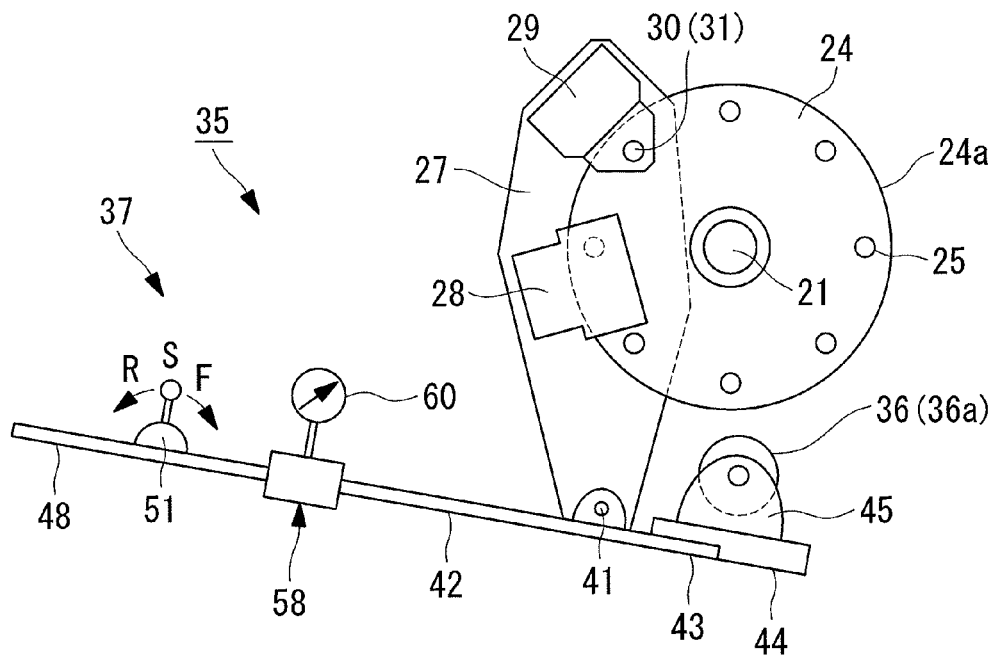
FIG. 3 is a front view of a pulley pressing mechanism in a state in which a motor-side friction pulley is at a free position.
Figure 4:
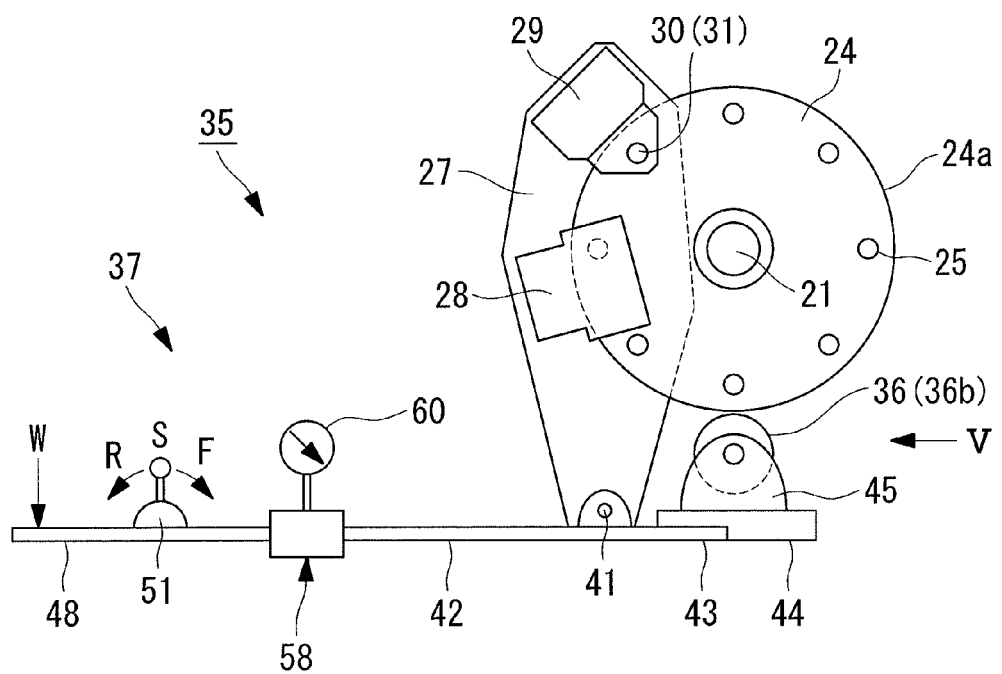
FIG. 4 is a front view of the pulley pressing mechanism in a state in which the motor-side friction pulley is at an engagement position.
Figure 5:
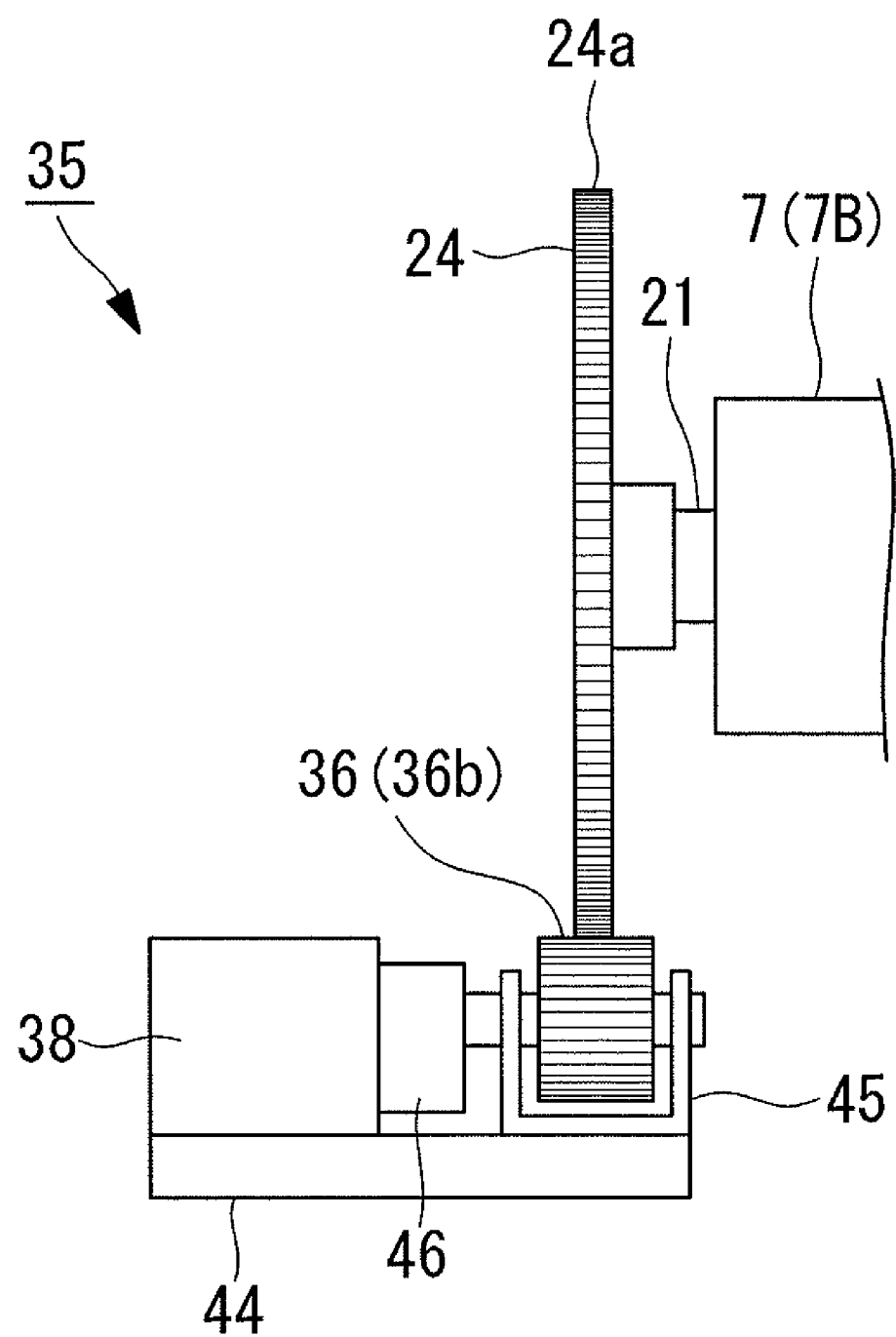
FIG. 5 is a side view of the pulley pressing mechanism viewed in the direction of arrow V in FIG. 4.
Figure 6:
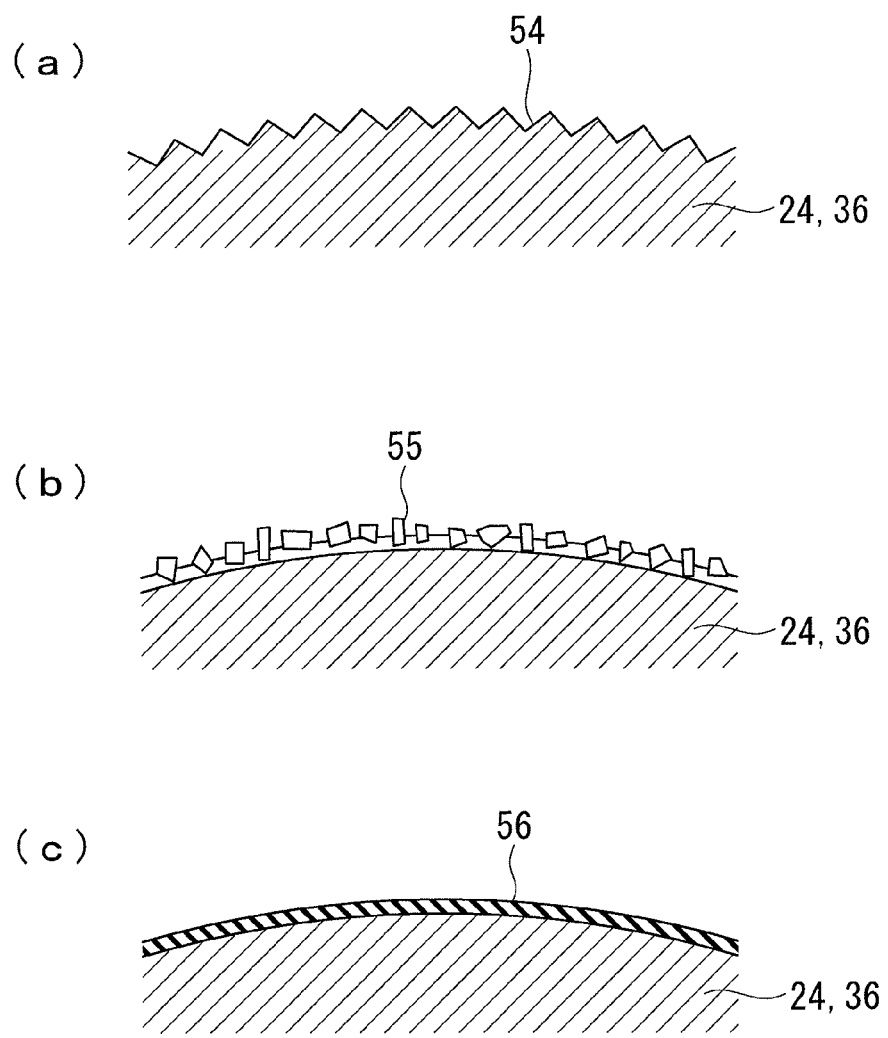
FIG. 6 illustrates examples of static-friction-coefficient increasing means, where
Figure 7:
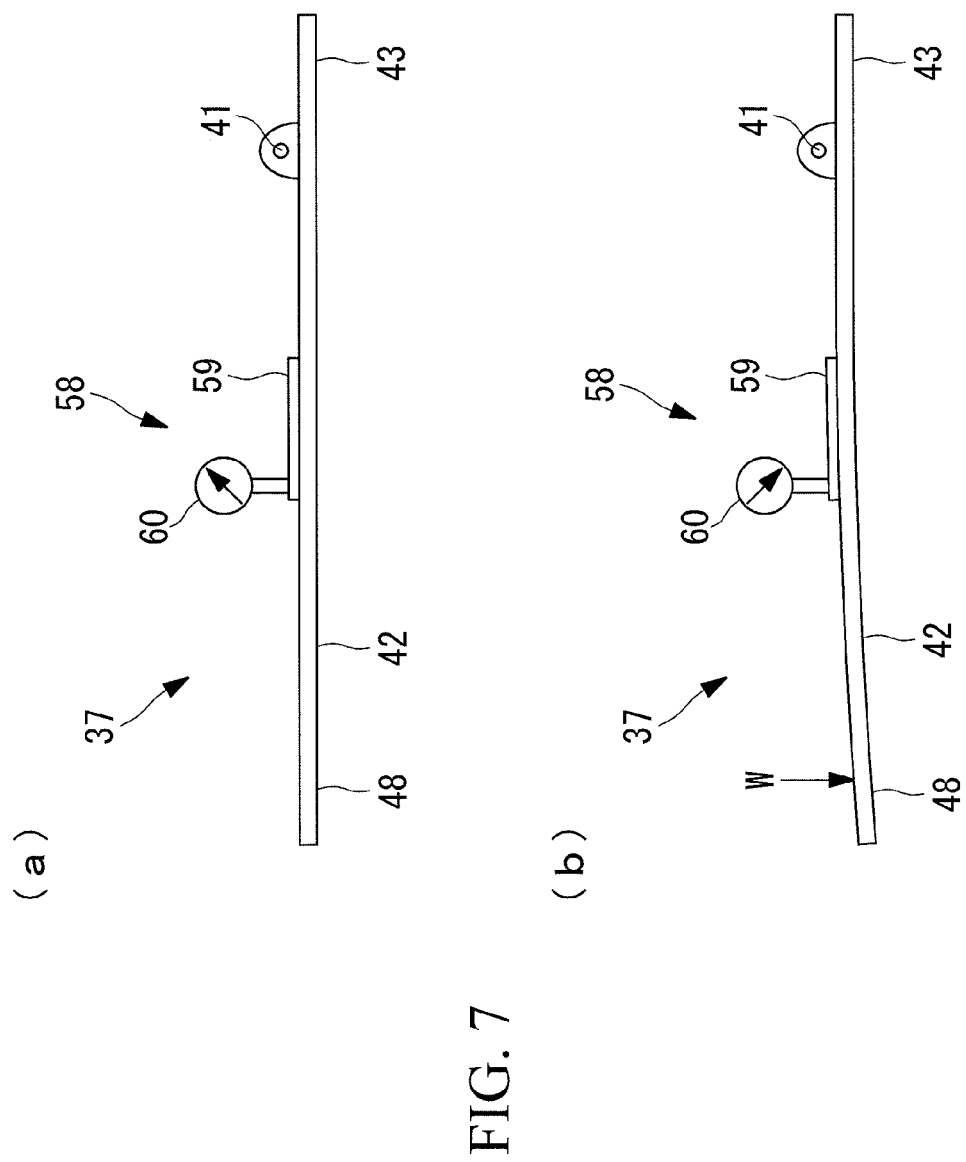
FIG. 7 illustrates an example in which an input display unit included in a pressing lever is a strain gauge, where
Figure 8:
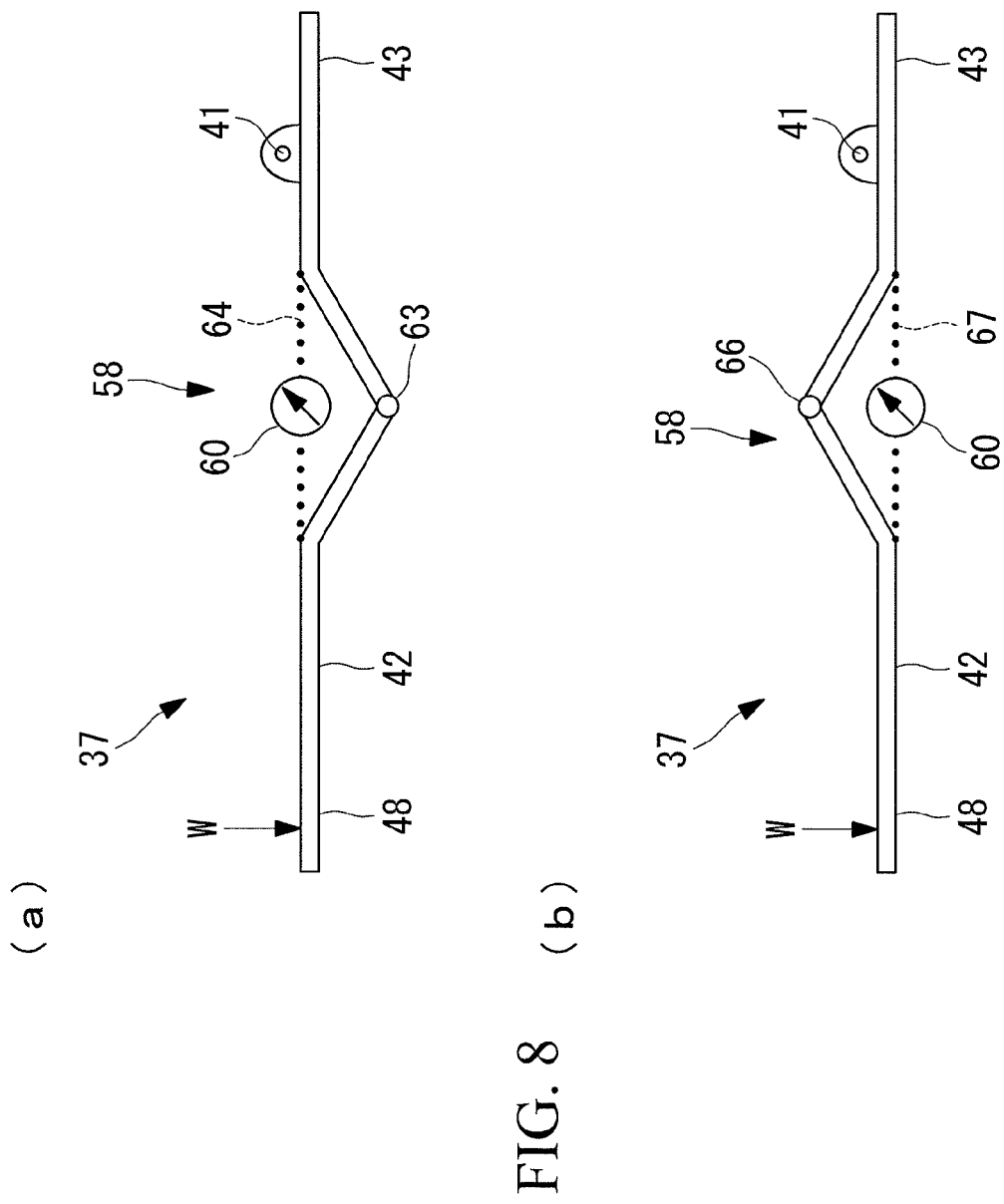
FIG. 8(a) is a front view of an example in which the input display unit included in the pressing lever is a tensiometer.
FIG. 8(b) is a front view of an example in which the input display unit included in the pressing lever is a compression meter.

As described above, the wind turbine generator 1 includes the turning device 35, which is illustrated in FIGS. 3 to 5, to turn the wind turbine rotor 5 to an arbitrary position. The turning device 35 has a configuration including the brake disc 24, which is disposed on and rotates together with the output shaft 21 of the gearbox 7 and functions as a driven-side friction pulley, a motor-side friction pulley 36, a pulley pressing mechanism 37, and an electric motor 38 (pulley driving means).

First, the pulley pressing mechanism 37 includes a fulcrum 41 provided near the lower end of the above-described caliper bracket 27 secured to the gearbox 7 (multi-step gear speed-up unit 7B) and a pressing lever 42 axially supported at the fulcrum 41 and freely pivotable in the vertical direction, where the motor-side friction pulley 36 is axially supported with a bearing bracket 45 on the upper surface of a support plate 44 secured on the point of load 43 of the pressing lever 42. Similarly, the electric motor 38 is secured on the upper surface of the support plate 44; and the motive power thereof is decreased by a small speed-reducer 46 and is transmitted to the motor-side friction pulley 36 so that the motor-side friction pulley 36 is rotationally driven.

The motor-side friction pulley 36, the pulley pressing mechanism 37, and the electric motor 38 are detachable from the fulcrum 41 of the caliper bracket 27.

As illustrated in FIG. 3, with the point of effort 48 of the pressing lever 42 being lifted upward by the weight of the motor-side friction pulley 36, the electric motor 38, small speed-reducer 46, etc., the motor-side friction pulley 36 is positioned at a free position 36a a certain distance away from the outer circumferential surface 24a of the brake disc 24, which is the driven-side friction pulley.

As illustrated in FIG. 4, by applying a predetermined force W to the point of effort 48 of the pressing lever 42, the motor-side friction pulley 36 raises, moves to an engagement position 36b, where it is pressed against the outer circumferential surface 24a of the brake disc 24, and frictionally engages with the outer circumferential surface 24a of the brake disc 24. The frictional engagement force between the motor-side friction pulley 36 and the brake disc 24 can be adjusted by means of the magnitude of the force W applied to the point of effort 48 of the pressing lever 42.

Near the point of effort 48 of the pressing lever 42, a switching lever 51 for switching the rotating direction of the electric motor 38 among forward rotation F, reverse rotation R, and stopped S, is provided. As described below, an input display unit 58 that displays the magnitude of the force applied to the point of effort 48 by the operator is disposed at the middle section of the pressing lever 42.

A static-friction-coefficient increasing means for increasing the coefficient of static friction is attached to the outer circumferential surface of at least one of the brake disc 24 and the motor-side friction pulley 36. Specifically, the coefficient of static friction is increased by applying knurling 54, as illustrated in FIG. 6(a), hard chips 55, as illustrated in FIG. 6(b), or a high-friction coating or elastic film 56, as illustrated in FIG. 6(c), to the outer circumferential surfaces of the brake disc 24 and the motor-side friction pulley 36. As a modification, the motor-side friction pulley 36 may be a rubber roller.

In general, the coefficient of static friction between two smooth metal surfaces is approximately 0.15. The coefficient of static friction can be significantly increased by attaching static-friction-coefficient increasing means, such as that described above. For the turning device 35, it is preferable to set the coefficient of static friction between approximately 0.5 and 1.3 because the brake disc 24 and the motor-side friction pulley 36 are disposed near the gearbox 7, bearings of other rotary bodies, etc., making it highly likely that oil adheres thereto. When the static-friction-coefficient increasing means is to be attached to the outer circumferential surfaces of both the brake disc 24 and the motor-side friction pulley 36, different types of static-friction-coefficient increasing means may be applied to these outer circumferential surfaces.

The input display unit 58 disposed at the intermediate section of the pressing lever 42 is configured to detect the magnitude of the force W applied to the point of effort 48 of the pressing lever 42 by the operator on the basis of the amount of bowing of the pressing lever 42. For example, with the examples illustrated in FIGS. 7(a) and 7(b), a strain gauge 59 is used as the input display unit 58, and the strain gauge 59 is bonded to the upper surface of the pressing lever 42. A dynamometer 60 that displays the reading of the strain gauge 59, i.e., the magnitude of the force W applied by the operator, is additionally provided. The suitable range of the magnitude of the force W is recorded on the dynamometer 60.

When the operator applies the force W to the point of effort 48 of the pressing lever 42, the motor-side friction pulley 36 is pressed against the outer circumferential surface 24a of the brake disc 24. When the force W continues to be applied, the pressing lever 42 bows downward, as illustrated in FIGS. 7(a) and 7(b). Consequently, the reading of the dynamometer 60 changes because the strain gauge 59, which is bonded to the upper surface of the pressing lever 42, is extended. The operator may adjust the force W so that the reading falls into the suitable range recorded in advance on the dynamometer 60. In this way, the pressure at which the motor-side friction pulley 36 is pressed against the brake disc 24 can be maintained within an optimal range.

With the example illustrated in FIG. 8(a), a hinge part 63, which is depressed downward, is provided at the intermediate section of the pressing lever 42, as well as a tensiometer 64, which is suspended across the hinge part 63. The tensiometer 64 detects the tension at the upper surface of the pressing lever 42. Instead, as illustrated in FIG. 8(b), a hinge part 66, which protrudes upward, may be provided at the intermediate section of the pressing lever 42, as well as a compression meter 67, which is suspended across the hinge part 66. The compression meter 67 detects the compression of the lower surface of the pressing lever 42. In either case, the dynamometer 60 is additionally provided in a manner similar to that for the strain gauge 59 illustrated in FIG. 7.

With the example illustrated in FIG. 8(a), when the operator applies the force W to the point of effort 48 of the pressing lever 42, the pressing lever 42 bows downward, causing the tensiometer 64 suspended across the hinge part 63 to be pulled, changing the reading on the dynamometer 60. In the example illustrated in FIG. 8(b), the pressing lever 42 bows downward by receiving the force W, causing the compression meter 67 to be compressed, changing the reading on the dynamometer 60. In either case, if the operator adjusts the force W so that the reading on the dynamometer 60 falls in the range recorded in advance, the motor-side friction pulley 36 can be pressed against and frictionally engaged with the brake disc 24 with optimal pressure.

With the turning device 35 having the configuration described above, the operator applies the force W to the pressing lever 42 of the pulley pressing mechanism 37 to move the motor-side friction pulley 36 from the free position 36a to the engagement position 36b such that the motor-side friction pulley 36 is pressed against and frictionally engaged with the outer circumferential surface 24a of the brake disc 24, which is the driven-side friction pulley. Next, the switching lever 51 disposed on the pressing lever 42 is operated to rotate the electric motor 38 forward or in reverse to rotationally drive the motor-side friction pulley 36. In this way, the rotation of the motor-side friction pulley 36 is transmitted to the output shaft 21 of the gearbox 7 via the brake disc 24, and the wind turbine rotor 5 is rotationally driven. Accordingly, the wind turbine rotor 5 can be easily turned to an arbitrary position.

Once the wind turbine rotor 5 turns to an arbitrary position, a brake operating part (not shown) is operated to apply a braking force to the brake disc 24 with the brake caliper 28, and at the same time, the rotation of the motor-side friction pulley 36 is stopped or the pressing lever 42 is lifted upward to move the motor-side friction pulley 36 away from the brake disc 24 so as to disengage the frictional engagement between the motor-side friction pulley 36 and the brake disc 24. Then, the lock-pin insertion hole 30 in the lock-pin bracket 29 and one of the lock-pin through-holes 25 in the brake disc 24 are aligned, and the lock pin 31 is inserted therein to lock the rotation of the wind turbine rotor 5.

With the turning device 35, in case there is a large torque fluctuation caused due to the wind turbine rotor 5 suddenly moving due to a gust while the wind turbine rotor 5 is being turned (turning) to an arbitrary position, the frictional engagement between the motor-side friction pulley 36 and the brake disc 24 slips due to such a sudden torque fluctuation. Accordingly, the large torque fluctuation due to the wind turbine rotor 5 is prevented from being directly transmitted in reverse to the electric motor 38. Hence, damage to driving-force transmitting parts, such as the motor-side friction pulley 36, the brake disc 24, and the output shaft 21, which transmit the rotation of the electric motor 38 to the wind turbine rotor 5 can be prevented. In particular, since a gear mechanism is not used here, serious damage, such as damage to gear teeth, due to excessive torque being applied thereto can be prevented.

The driving-force transmitting parts, such as the motor-side friction pulley 36 and the brake disc 24, do not need to be designed with high strength to withstand the large torque fluctuation generated by the wind turbine rotor 5 when there is a gust of wind, and, in addition, the structure can be extremely simple, and an expensive gear mechanism is not required because the motor-side friction pulley 36 and the brake disc 24 are friction pulleys. In addition, the electric motor 38 driving the motor-side friction pulley 36 can be low powered, just enough for turning the wind turbine rotor 5 when the wind speed is 3 m/s or less. Accordingly, the entire turning device 35 can be formed inexpensively and, thus, can contribute to a reduction in the manufacturing cost of the wind turbine generator 1.

In addition, since the turning device 35 can have an extremely small and light-weight configuration and the portability thereof can be improved, the turning device 35 may be carried in to the wind turbine generator 1 by the operator only at the time of maintenance, instead of permanently installing it therein; thus, the cost of the wind turbine generator 1 can be reduced even more.

Since the brake disc 24, which is typically installed on the output shaft 21 of the gearbox 7, doubles as the driven-side friction pulley of the turning device 35, it is not necessary to provide a new component as a driven-side friction pulley; thus, the turning device 35 can be made even more inexpensive.

The pulley pressing mechanism 37 of the turning device 35 includes the fulcrum 41 provided on the gearbox 7 and the pressing lever 42 axially supported at the fulcrum 41 and is configured such that the motor-side friction pulley 36 and the electric motor 38 are provided at the point of load 43 of the pressing lever 42 and such that the motor-side friction pulley 36 is moved from the free position 36a, which is a certain distance away from the brake disc 24, to the engagement position 36b and is pressed against the brake disc 24 by applying the force W to the point of effort 48 of the pressing lever 42 by the operator.

Therefore, through an extremely simple and inexpensive structure, the rotation of the motor-side friction pulley 36 can be transmitted to the brake disc 24 to reliably drive it. At this time, by adjusting the force W applied to the pressing lever 42 by the operator, the frictional engagement force between the motor-side friction pulley 36 and the brake disc 24 can be adjusted, and the rotation of the brake disc 24 can be easily controlled. Thus, the wind turbine rotor 5 can be easily turned to an arbitrary position.

Since the static-friction-coefficient increasing means (54, 55, 56) for increasing the coefficient of static friction is attached to at least one of the brake disc 24 and the motor-side friction pulley 36, the frictional engagement force between the brake disc 24 and the motor-side friction pulley 36 is increased, and the slippage between the members 24 and 36 can be reduced. Thus, the wind turbine rotor 5 can be easily turned quickly to a desired position. Moreover, since the coefficient of static friction is improved, the force W that presses the motor-side friction pulley 36 against the brake disc 24 can be small, which facilitates operation by the operator, and the structures of the pressing lever 42, the fulcrum 41, etc. can be simplified to make the configuration of the pulley pressing mechanism 37 simple, light weight, and inexpensive.

In this embodiment, since the coefficient of static friction between the brake disc 24 and the motor-side friction pulley 36 is set to between 0.5 and 1.3, the rotation of the motor-side friction pulley 36 is reliably transmitted to the brake disc 24, and damage to the electric motor 38, and the motor-side friction pulley 36 and brake disc 24, etc., which transmit the driving force of the electric motor 38 to the wind turbine rotor 5, can be prevented by allowing the frictional engagement between the motor-side friction pulley 36 and the brake disc 24 to slip when the wind turbine rotor 5 suddenly turns due to a gust of wind.

Since the input display unit 58 for displaying the magnitude of the force W applied to the point of effort 48 by the operator is disposed on the pressing lever 42, the magnitude of the force applied to the pressing lever 42 by the operator can be determined. Therefore, if an optimal magnitude of the force is set in advance, the rotation of the motor-side friction pulley 36 can be reliably transmitted to the brake disc 24 while maintaining the contact pressure of the motor-side friction pulley 36 and the brake disc 24 at an optimal magnitude, and damage to the electric motor 38, the motor-side friction pulley 36, the brake disc 24, etc. can be prevented by relaxing destructive torque by allowing the friction engagement between the motor-side friction pulley 36 and the brake disc 24 to slip when there is a gust of wind.

Furthermore, since the input display unit 58 is configured to detect the magnitude of the force W applied by the operator on the basis of the amount of bowing of the pressing lever 42, the magnitude of the force W applied by the operator is detectable by an extremely simple configuration, and the turning device 35 can be formed inexpensively.

According to the turning device 35 having the configuration described above and the wind turbine generator 1 including the same, the wind turbine rotor 5 can be easily turned to an arbitrary position, and in addition, the level of safety when there is a gust of wind can be increased through a simple and inexpensive configuration. Moreover, the manufacturing cost of the turning device 35 itself, as well as the wind turbine generator 1 can be reduced, and the maintainability of the wind turbine generator 1 can be improved so as to contribute to the widespread adoption of wind turbine generators.

The present invention is not limited to the configuration of the embodiment described above, and various modifications and improvements are possible without departing from the scope of the invention; embodiments with such modifications and improvements are also included in the scope of the present invention.

For example, in the embodiment described above, the motor-side friction pulley 36 of the turning device 35 is rotationally driven by the motive power of the electric motor 38; instead, the motor-side friction pulley 36 may be rotationally driven by motive power from a member other than the electric motor 38 or by manual power.

In the embodiment described above, the rotation of the motor-side friction pulley 36 is transmitted to the brake disc 24 by directly pressing the motor-side friction pulley 36 against the brake disc 24; instead, the motor-side friction pulley 36 and the brake disc 24 may be frictionally engaged by, for example, disposing the motor-side friction pulley 36 and the brake disc 24 a certain distance away from each other and wrapping a belt around the members 24 and 36. Furthermore, the motor-side friction pulley 36 may be frictionally engaged with the brake disc 24 by pulling up the pressing lever 42, instead of pushing it down.

Furthermore, although the wind turbine generator 1 according to the above-described embodiment is configured such that the rotation of the wind turbine rotor 5 is increased by the mechanical gearbox 7, which combines the planetary gear speed-up unit 7A and the multi-step gear speed-up unit 7B, and is transmitted to the generator 6, a non-mechanical type gearbox (for example, a hydraulic gearbox) may be used. The present invention can be applied to a synchronous generator type (gearless wind-turbine) in which no gearbox is provided, and the rotation of the wind turbine rotor is directly transmitted to a generator.

In the embodiment described above, although an example in which the present invention is applied to the upwind type wind turbine generator 1 including the wind turbine rotor 5 disposed on the windward surface of the nacelle 4 is described, the present invention may be applied to a downwind type wind turbine generator including a wind turbine rotor disposed on a downwind surface of a nacelle. Obviously, the turning device 35 according to the present invention may be applied to wind-turbine apparatuses other than wind turbine generators.

What is claimed is:

1. A turning device for a wind turbine rotor, configured to turn the wind turbine rotor to an arbitrary position, the turning device comprising:
   a driven-side friction pulley configured to rotate together with an output shaft of the wind turbine rotor;
   a motor-side friction pulley configured to be movable between an engagement position where the motor-side friction pulley frictionally engages with an outer circumferential surface of the driven-side friction pulley and a free position where the motor-side friction pulley is not frictionally engaged with the outer circumferential surface of the driven-side friction pulley;
   a pulley pressing mechanism configured to move the motor-side friction pulley from the free position to the engagement position by manual power of an operator and to frictionally engage the motor-side friction pulley with the outer circumferential surface of the driven-side friction pulley; and
   pulley driving means for rotationally driving the motor-side friction pulley.

2. The turning device for a wind turbine rotor according to claim 1, wherein the driven-side friction pulley is a rotation restricting member that is disposed on the output shaft so as to rotate together with the output shaft and that is configured to brake and/or lock the rotation of the output shaft.

3. The turning device for a wind turbine rotor according to claim 1, wherein
   the pulley pressing mechanism includes
      a fulcrum disposed on a bearing member of the output shaft, and
      a pressing lever axially supported at the fulcrum;
   the motor-side friction pulley is disposed at a point of load of the pressing lever; and
   the motor-side friction pulley is moved to the engagement position to be frictionally engaged with the outer circumferential surface of the driven-side friction pulley by the operator applying a force to a point of effort of the pressing lever.

4. The turning device for a wind turbine rotor according to claim 1, wherein static-friction-coefficient increasing means for increasing a coefficient of static friction is attached to at least one of the outer circumferential surfaces of the driven-side friction pulley and the motor-side friction pulley.

5. The turning device for a wind turbine rotor according to claim 4, wherein the coefficient of static friction is set between 0.5 and 1.3.

6. The turning device for a wind turbine rotor according to claim 3, wherein the pressing lever includes an input display unit configured to display the magnitude of the force applied to the point of effort by the operator.

7. The turning device for a wind turbine rotor according to claim 6, wherein the input display unit is configured to detect the magnitude of the force applied by the operator on the basis of an amount of bowing of the pressing lever.

8. A wind turbine generator comprising:
   the turning device for a wind turbine rotor according to claim 1.

* * * * *